(12) United States Patent
Awater et al.

(10) Patent No.: US 7,046,649 B2
(45) Date of Patent: May 16, 2006

(54) INTEROPERABILITY FOR BLUETOOTH/IEEE 802.11

(75) Inventors: Geert Arnout Awater, Utrecht (NL); Ran-Hong Yan, Farington (GB)

(73) Assignee: Agere Systems Inc., Allentown, PA (US)

( * ) Notice: Subject to any disclaimer, the term of this patent is extended or adjusted under 35 U.S.C. 154(b) by 761 days.

(21) Appl. No.: 09/761,074

(22) Filed: Jan. 16, 2001

(65) Prior Publication Data

US 2001/0010689 A1    Aug. 2, 2001

(30) Foreign Application Priority Data

Jan. 20, 2000   (EP)   .................... 00300397

(51) Int. Cl.
*H04Q 7/24*   (2006.01)

(52) U.S. Cl. ............... 370/338; 370/341; 370/347

(58) Field of Classification Search ............. 370/277, 370/278, 280, 282, 294, 310, 339, 345, 349, 370/352, 389, 466, 468, 498, 478, 344, 347, 370/328, 338, 337, 465; 455/78, 83
See application file for complete search history.

(56) References Cited

U.S. PATENT DOCUMENTS

| | | | |
|---|---|---|---|
| 4,876,743 A * | 10/1989 | Lindenmeier et al. | 455/133 |
| 5,903,548 A | 5/1999 | Delamater | 370/310 |
| 5,960,344 A | 9/1999 | Mahany | 455/432 |
| 6,326,926 B1 * | 12/2001 | Shoobridge et al. | 343/702 |
| 6,526,264 B1 * | 2/2003 | Sugar et al. | 455/84 |
| 6,560,443 B1 * | 5/2003 | Vaisanen et al. | 455/73 |
| 6,600,726 B1 * | 7/2003 | Nevo et al. | 370/278 |
| 6,717,801 B1 * | 4/2004 | Castell et al. | 361/683 |
| 6,842,607 B1 * | 1/2005 | Godfrey et al. | 455/41.2 |

FOREIGN PATENT DOCUMENTS

WO    WO 99/29126    6/1999

OTHER PUBLICATIONS

European Search Report, dated Jun. 27, 2000.

* cited by examiner

*Primary Examiner*—Andrew C. Lee
*Assistant Examiner*—Soon D. Hyun

(57) ABSTRACT

The key of the invention is to introduce an interoperability device in a communication system which integrates an IEEE 802.11 transceiver and a Bluetooth transceiver. The device prevents that one transceiver is transmitting while the other is receiving, which would cause interference at the receiving transceiver. In addition, the device preferably prevents that both systems are transmitting at the same time to avoid interference at the receiving device(s). Optionally the device prohibits simultaneous reception of both transceivers. In that way the radio receiver can be shared between the devices, allowing a cheaper and smaller hardware design.

44 Claims, 3 Drawing Sheets

INTEROPERABILITY FOR BLUETOOTH/IEEE 802.11

CROSS-REFERENCE TO RELATED APPLICATION

This application claims priority of European Patent Application No. 00300397.7, which was filed on Jan. 20, 2000.

FIELD OF THE INVENTION

The present invention relates to both Bluetooth and IEEE 802.11 radio communication systems.

DESCRIPTION OF THE RELATED ART

IEEE 802.11 is a standard for wireless systems that operate in the 2.4–2.5 GHz ISM (industrial, scientific and medical) band. This ISM band is available world-wide and allows unlicensed operation for spread spectrum systems. For both the US and Europe, the 2,400–2,483.5 MHz band has been allocated, while for some other countries, such as Japan, another part of the 2.4–2.5 GHz ISM band has been assigned. The 802.11 standard focuses on the MAC (medium access control) protocol and PHY (physical layer) protocol for access point (AP) based networks and ad-hoc networks.

In access point based networks, the stations within a group or cell can communicate only directly to the access point. This access point forwards messages to the destination station within the same cell or through a wired distribution system to another access point, from which such messages arrive finally at the destination station. In ad-hoc networks, the stations operate on a peer-to-peer level and there is no access point or (wired) distribution system.

The 802.11 standard supports: DSSS (direct sequence spread spectrum) with differential encoded BPSK and QPSK; FHSS (frequency hopping spread spectrum) with GFSK (Gaussian FSK); and infrared with PPM (pulse position modulation). These three physical layer protocols (DSSS, FHSS and infrared) all provide bit rates of 2 and 1 Mbit/s. The 802.11 standard further includes extensions 11a and 11b. Extension 11b is for a high rate CCK (Complementary Code Keying) physical layer protocol, providing bit rates 11 and 5.5 Mbit/s as well as the basic DSSS bit rates of 2 and 1 Mbit/s within the same 2.4–2.5 GHz ISM band. Extension 11a is for a high bit rate OFDM (Orthogonal Frequency Division Multiplexing) physical layer protocol standard providing bit rates in the range of 6 to 54 Mbit/s in the 5 GHz band.

The 802.11 basic medium access behavior allows interoperability between compatible physical layer protocols through the use of the CSMA/CA (carrier sense multiple access with a collision avoidance) protocol and a random back-off time following a busy medium condition. In addition all directed traffic uses immediate positive acknowledgement (ACK frame), where a retransmission is scheduled by the sender if no positive acknowledgement is received. The 802.11 CSMA/CA protocol is designed to reduce the collision probability between multiple stations accessing the medium at the point in time where collisions are most likely occur. The highest probability of a collision occurs just after the medium becomes free, following a busy medium. This is because multiple stations would have been waiting for the medium to become available again. Therefore, a random back-off arrangement is used to resolve medium contention conflicts. In addition, the 802.11 MAC defines: special functional behavior for fragmentation of packets; medium reservation via RTS/CTS (request-to-send/clear-to-send) polling interaction; and point co-ordination (for time-bounded services).

The IEEE 802.11 MAC also defines Beacon frames, sent at a regular interval by an AP to allow STAs to monitor the presence of the AP. IEEE 802.11 also defines a set of management frames including Probe Request frames which are sent by an STA, and are followed by Probe Response frames sent by the AP. Probe Request frames allow an STA to actively scan whether there is an AP operating on a certain channel frequency, and for the AP to show to the STA what parameter settings this AP is using.

Bluetooth technology allows for the replacement of the many proprietary cables that connect one device to another with one universal short-range radio link. For instance, Bluetooth radio technology built into both a cellular telephone and a laptop would replace the cumbersome cable used today to connect a laptop to a cellular telephone. Printers, personal digital assistant's (PDA's), desktops, computers, fax machines, keyboards, joysticks and virtually any other digital device can be part of the Bluetooth system. But beyond un-tethering devices by replacing the cables, Bluetooth radio technology provides a universal bridge to existing data networks, a peripheral interface, and a mechanism to form small private ad-hoc groupings of connected devices away from fixed network infrastructures.

Designed to operate in a noisy radio frequency environment, the Bluetooth radio system uses a fast acknowledgement and frequency hopping scheme to make the link robust. Bluetooth radio modules avoid interference from other signals by hopping to a new frequency after transmitting or receiving a packet. Compared with other systems operating in the same frequency band, the Bluetooth radio system typically hops faster and uses shorter packets. This makes the Bluetooth radio system more robust than other systems. Short packets and fast hopping also limit the impact of domestic and professional microwave ovens. Use of Forward Error Correction (FEC) limits the impact of random noise on long-distance links. The encoding is optimised for an uncoordinated environment. Bluetooth radios operate in the unlicensed ISM band at 2.4 GHz. A frequency hop transceiver is applied to combat interference and fading. A shaped, binary FM modulation is applied to minimise transceiver complexity. The gross data rate is 1 Mb/s.

A Time-Division Duplex scheme is used for full-duplex transmission. The Bluetooth baseband protocol is a combination of circuit and packet switching. Slots can be reserved for synchronous packets. Each packet is transmitted in a different hop frequency. A packet nominally covers a single slot, but can be extended to cover up to five slots. Bluetooth can support an asynchronous data channel, up to three simultaneous synchronous voice channels, or a channel which simultaneously supports asynchronous data and synchronous voice. Each voice channel supports 64 kb/s synchronous (voice) link. The asynchronous channel can support an asymmetric link of maximally 721 kb/s in either direction while permitting 57.6 kb/s in the return direction, or a 432.6 kb/s symmetric link.

The IEEE 802.11 standard is well-established and local area networks are already implemented based on the standard, typically in office environments. As Bluetooth comes into the market, it is likely to be implemented in a domestic environment for communications within the home, for example. Thus someone with a lap-top computer may wish to connect to a IEEE 802.11 wireless local area network in the workplace, and connect to a device, such as a mobile telephone, using a Bluetooth interface outside of the workplace.

A need exists for a means which can enable a single device to interface via both an IEEE 802.11 radio system and a Bluetooth radio system.

SUMMARY OF THE INVENTION

According to one aspect of the present invention there is provided a device incorporating a first radio system operating at a first range of frequencies of operation and a second radio system operating at a second range of frequencies of operation, wherein at least a part of said first and second range of frequencies overlap, wherein the device further includes a control means adapted to control the first and second radio systems such that such that only one or the other radio system may transmit at any one time. The first radio system may be a Bluetooth system and the second radio system may be an IEEE 802.11 system.

The device may be additionally controlled such that when one device is transmitting the other device cannot receive or transmit. The device may be additionally controlled such that when one device is receiving the other device cannot receive or transmit.

The control means may comprise a switching means, the switching means being adapted to switch on and off the first and second radio systems.

The control means may comprise a multiplexing means adapted to time multiplex transmissions from the first and second radio systems.

The control means may comprise a multiplexing means adapted to time multiplex transmissions from the Bluetooth and IEEE 802.11 radio systems, the IEEE 802.11 and Bluetooth transmissions being multiplexed into Bluetooth time-slots.

The Bluetooth transmissions may be through a single HV2 SCO link connection, the IEEE 802.11 transmissions being in two time-slots in every four. The Bluetooth transmissions may be through a single HV3 SCO link connection, the IEEE 802.11 transmissions being in four time-slots in every six. The Bluetooth transmissions may be through two HV3 SCO link connections, the IEEE 802.11 transmissions being in two time-slots in every six.

The control means may prevent transmission of IEEE 802.11 packets during a Bluetooth ACL packet transmission. The control means may prevent transmission of Bluetooth ACL packets during an IEEE 802.11 packet transmission.

The first and second radio systems may share a common physical layer.

According to another aspect of the present invention there is provided a method of incorporating a first radio system operating at a first range of frequencies of operation and a second radio system operating at a second range of frequencies of operation, wherein at least a part of said first and second range of frequencies overlap, into a single device, wherein the first and second radio systems are controlled such that only one or the other radio system may transmit at any one time. The first radio system may be a Bluetooth system and the second radio system may be an IEEE 802.11 system.

The method may further comprise controlling the radio systems such that when one radio system is transmitting the other device cannot receive or transmit.

The method may further comprise controlling the radio systems such that one device is receiving the other device cannot receive or transmit.

The radio systems may be controlled by switching on and off the first and second radio systems.

The radio systems may be controlled by time multiplexing transmissions from the first and second radio systems.

The method may comprise time multiplexing transmissions from the Bluetooth and IEEE 802.11 radio systems, the IEEE 802.11 and Bluetooth transmissions being multiplexed into Bluetooth time-slots.

The Bluetooth transmissions may be through a single HV2 SCO link connection, the IEEE 802.11 transmissions being in two time-slots in every four. The Bluetooth transmissions may be through a single HV3 SCO link connection, the IEEE 802.11 transmissions being in four time-slots in every six. The Bluetooth transmissions may be through two HV3 SCO link connections, the IEEE 802.11 transmissions being in two time-slots in every six.

The method may further comprising preventing transmission of IEEE 802.11 packets during a Bluetooth ACL packet transmission. The method may further comprising preventing transmission of Bluetooth ACL packets during an IEEE 802.11 packet transmission.

The first and second radio systems may share a common physical layer.

Therefore if both an IEEE 802.11 radio transceiver and a Bluetooth radio transceiver reside in a single device (for instance in a laptop computer) they can transmit and receive in the same radio frequency simultaneously, even though both communication standards make use of the same 85 MHz wide ISM band, at around 2.4 GHz. This is achieved by a Bluetooth device in a computer being prevented from transmitting data whilst an 802.11 device is attempting to receive data and vice versa.

Even if the RF frequency that the receiving device is tuned to is different, but still in the same band that the transmitting device is using, the emitted power will jam the receiver, rendering it unable to receive the intended signal.

The invention solves this problem by introducing an interoperability device, that is connected both to the medium access controller of the IEEE 802.11 device and to the baseband controller of the Bluetooth device.

The invention also proposes an alternative solution, called dual mode operation, where the IEEE 802.11 devices operate in a different radio frequency band than the Bluetooth system.

The key of the invention is to introduce an interoperability device in a communication system which integrates an IEEE 802.11 transceiver and a Bluetooth transceiver. The device prevents that one transceiver from transmitting while the other is receiving, which would cause interference at the receiving transceiver. In addition, the device prevents that both systems from transmitting at the same time to avoid interference at the receiving device(s), optionally the device prohibits simultaneous reception of both transceivers. In that way the radio receiver can be shared between the devices, allowing a cheaper and smaller hardware design. The invention also covers a dual band mode in which the IEE802.11 device and the Bluetooth device work in a different frequency band, and allows completely parallel operation of the two devices.

BRIEF DESCRIPTION OF THE DRAWINGS

The invention will now be described by way of example with reference to the accompanying Figures, in which.

DETAILED DESCRIPTION OF THE PREFERRED EMBODIMENT

The invention serves to solve a fundamental problem associated with providing both a Bluetooth radio system and an IEEE 802.11 radio system in a single device. The fundamental problem that has been identified is that if either one of the radio systems is transmitting, there is need to prevent the other radio system from receiving or else the receiving system will be drowned out by the transmitting system. As will be further discussed hereinbelow, further problems associated with the dual operation of a IEEE 802.11 and Bluetooth radio system are overcome by preferred embodiments of the present invention as discussed hereinbelow.

Figure 1:
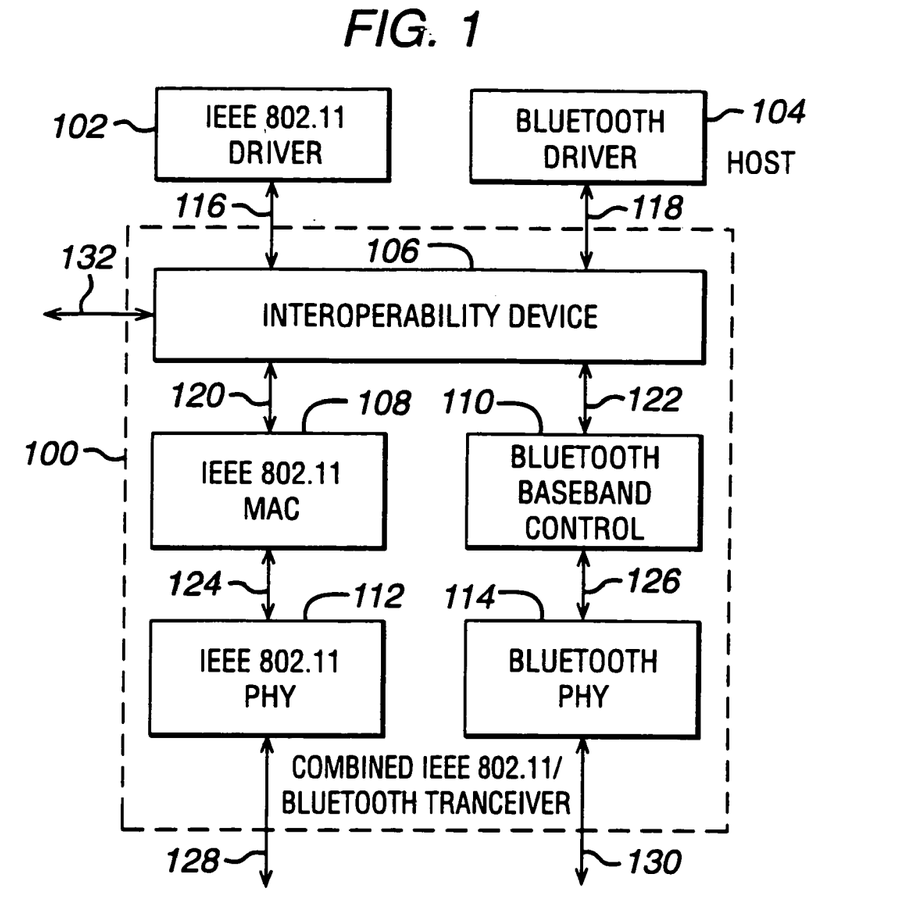
FIG. 1 illustrates a high-level architecture for implementing the present invention.

Referring to FIG. 1, there is illustrated a high-level architecture of the combination of an IEEE 802.11 radio system transceiver and a Bluetooth radio system transceiver in a single system, in conjunction with an interoperability device in accordance with the present invention. It will be understood by one skilled in the art that only those elements necessary for the implementation of the present invention are shown in FIG. 1.

The dual mode transceiver of FIG. 1 comprises: an IEEE 802.11 physical layer functional element 112; an IEEE 802.11 MAC layer functional element 108; a Bluetooth physical layer functional element 114; a Bluetooth baseband control functional element 110; and an interoperability device 106, all of which comprise a combined IEEE 802.11/Bluetooth transceiver generally designated by reference numeral 100. In addition an IEEE 802.11 driver 102 and a Bluetooth driver 104 are shown in FIG. 1.

The IEEE 802.11 driver 102 receives IEEE 802.11 packets from the dual mode transceiver 100 on lines 116, and transmits IEEE 802.11 packets to the dual mode transceiver 100 on lines 116. The Bluetooth driver 104 receives Bluetooth packets from the dual mode transceiver 100 on lines 118, and transmits Bluetooth packets to the dual mode transceiver on lines 118. The operation of the respective drivers 102 and 104 is exactly the same as their operation would be if the device were provided with a single IEEE 802.11 or Bluetooth transceiver respectively. However their function may be extended in the sense that they pass on switching signal from application(s) to the interoperability device 106.

The IEEE 802.11 MAC functional element 108 and the IEEE 802.11 physical functional element 112 form the IEEE 802.11 transceiver of the dual mode transceiver. The IEEE 802.11 MAC functional element 108 operates in accordance with the IEEE standard arrangement to control access to the IEEE 802.11 transmission medium by the device to which it is connected. The IEEE 802.11 MAC functional element 108 receives and transmits IEEE 802.11 packets to and from the interoperability device 106 via lines 120, and transmits and receives IEEE 802.11 packets to and from the IEEE 802.11 physical layer functional element 112 via lines 124. The IEEE 802.11 physical layer functional element 112 operates in accordance with the IEEE standard arrangement to perform modulation etc. of the IEEE 802.11 packets and transmit/receive the packets via lines 128, which interface the element to the device antenna.

The Bluetooth baseband control functional element 110 and the Bluetooth physical layer functional element 114 form the Bluetooth transceiver of the dual mode transceiver. The Bluetooth baseband control functional element 110 operates in accordance with the Bluetooth standard arrangement to control access to the transmission medium by the device to which it is connected. The Bluetooth baseband control functional element 110 receives and transmits Bluetooth packets to and from the interoperability device 106 via lines 122, and transmits and receives Bluetooth packets to and from the Bluetooth physical layer functional element 114 via lines 126. The IEEE 802.11 physical layer functional element 114 operates in accordance with the Bluetooth standard arrangement to perform modulation etc. of the Bluetooth packets and transmit/receive the packets via lines 130, which interface the element to the device antenna.

The control of IEEE 802.11 packets and Bluetooth packets from the respective drivers 102 and 104 to the respective transceiver elements 108/112 and 110/114 is controlled in accordance with the invention by the interoperability device 106. As shown in FIG. 1, the interoperability device is additionally connected to control circuitry within the device via control signal lines 132.

The dual mode transceiver 100 operates in accordance with the invention in one of two modes. A first mode is a switching mode and a second mode is a multiplexing mode, both of which modes are discussed in further detail herein below.

In the switching mode of operation, the interoperability device 106 deactivates the Bluetooth transceiver (110/114) whenever the IEEE 802.11 transceiver (108/112) is activated, and vice versa. The interoperability device 106 is adapted to make the decision as to which mode of operation to switch to or activate. There are several alternative criteria on which the interoperability device may make this decision.

In a first alternative, the user of the device may decide which mode to switch to. For instance when the user is at home and wants to connect to the Internet through a telephone, the user may decide to switch to Bluetooth mode and dial up to an Internet Service Provider (ISP). When the user is in the office, where an IEEE 802.11 wireless LAN is present, the IEEE 802.11 mode may be selected by the user, to enable the user to log on to the network. This mode requires the user to know which is the appropriate interface to use for the chosen application. The user command will most likely be provided through an interface, such as a screen and keypad, on the device itself, and notified to the interoperability device 106 via a command signal from a central processor or controller in the device. In addition mixed environments, where both Bluetooth and IEEE 802.11 exist, may be present for example in an office environment.

In an alternative, the notification of the mode of operation may be provided to the transceivers via control from the CPU through regular drivers, or through a dedicated interoperability device driver.

In a second alternative, application software may control which mode the device switches to. For instance when the user chooses to synchronise a Personal Digital Assistant (PDA), the data-synchronisation application in the PC may tell the interoperability device to switch to Bluetooth mode. When the user chooses to surf the World Wide Web (WWW), the browser application (or the network driver software supporting it) may tell the interoperability device to switch to IEEE 802.11 mode. Again, the interoperability device 106 may be instructed via a command signal from a central processor or controller.

In a third alternative, a protocol sniffer may determine whether it detects the presence of an IEEE 802.11 device or a Bluetooth device on the air interface, and set the mode of the interoperability device accordingly. When the protocol sniffer detects both Bluetooth and IEEE 802.11 devices, it may choose a mode that the user has indicated as preferential, or it may consult the user as in the first alternative. Alternatively, the protocol sniffer may let the application decide as in the second alternative.

Thus in the switching mode the interoperability device operates merely to deactivate, or switch off, one of the two transceivers within the dual mode transceiver. This operation is transparent to the functional elements of the respective transceivers, and also to the other processing functionality in the device itself. When the interoperability device is switched to "IEEE 802.11" mode the transceiver 100 behaves as an IEEE 802.11 transceiver. When the interoperability device is switched to "Bluetooth" mode the transceiver 100 behaves as an Bluetooth transceiver.

In the switching mode, turning off one transceiver when the other is transmitting means that the one transceiver cannot receive or transmit when the other is transmitting. Thus when employing the switching mode only one radio system needs to be operating at a given time, which means that the radio hardware can be reused.

Figure 2:
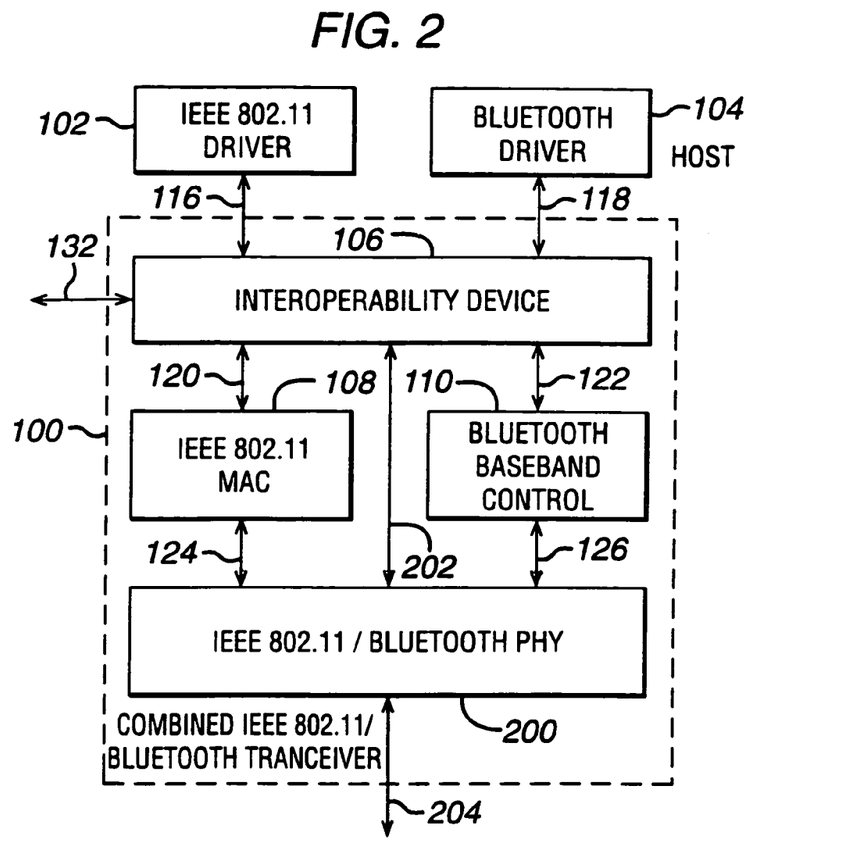
FIG. 2 illustrates the architecture of FIG. 1 adapted to utilise radio re-use in accordance with a preferred embodiment of the invention.

FIG. 2 illustrates the dual mode transceiver of FIG. 1 re-configured to utilise radio re-use. As can be seen from FIG. 2, the functionality of the IEEE 802.11 physical layer functional element 112 and the Bluetooth physical layer functional element 114 are combined into a single functional element referred to as the IEEE 802.11/Bluetooth dual physical layer functional element, and denoted by reference numeral 200. The dual functional element 200 transmits and receives IEEE 802.11 and Bluetooth packets on signal lines 204 to the device antenna.

The IEEE 802.11/Bluetooth dual physical layer functional element is controlled by the interoperability device via signal lines 202 to operate as the physical layer functional element for either IEEE 802.11 or Bluetooth in accordance with the current mode of operation selected.

In the multiplexing mode of operation the IEEE 802.11 transmitter is switched off when the Bluetooth transmitter is receiving data and the Bluetooth transmitter is switched off when the IEEE 802.11 device is receiving data. In this way one radio system is never transmitting when the other is receiving, and vice versa. The interoperability device 106 observes the rules of the medium access control protocols, and while the transmission and reception of the IEEE 802.11 and Bluetooth radio systems are time multiplexed, it will appear to the user that the two systems operate in parallel. There will, however, be some performance impact (reduced data throughput, increased data error rate, reduced voice quality).

Furthermore, the interoperability device 106 additionally preferably does not allow the IEEE 802.1 and Bluetooth radio systems to transmit at the same time. Thus interference of one signal with the other at an external (remote) receiver is prevented.

In a preferred implementation of the multiplexing mode, if an IEEE 802.11 packet must be transmitted, all Bluetooth data connections are placed in the so-called PARK mode. The interoperability device 106 will issue one HLC_Park_Mode primitive per active ACL (Asynchronous Connectionless data) connection to the Bluetooth transceiver, to put all ACL connections in PARK mode. The PARK mode of the Bluetooth radio system will be familiar to one skilled in the art. In this way, the Bluetooth radio system is deactivated whilst an IEEE 802.11 transmission takes place.

Although the example implementation is presented herein with reference to a discussion of the Bluetooth PARK mode, it will be appreciated by one skilled in the art that the Bluetooth HOLD mode may alternatively be utilised.

If there are active Bluetooth SCO (Synchronous, connection-oriented voice) connections, which transmit and receive periodically in a 0.625 ms Bluetooth slot, then the IEEE 802.11 transceiver must schedule its packet transmissions in-between the Bluetooth packets. The Bluetooth SCO connections are real-time (voice) connections. The interoperability device 106 must take the full IEEE packet exchange period into account, which includes an acknowledgement packet (ACK) and (when the RTS/CTS transmission mode is used) an RTS and CTS packet.

Further hereinbelow a detailed implementation for scheduling IEEE 802.11 packets in an active SCO connection is given. A 'slot-stealing' scheme is explained and a calculation of data throughput that can be achieved given.

The IEEE 802.11 packets may need to be as short as a single slot when such a slot-stealing scheme is implemented, and this implies that the interoperability device 106 has to implement a packet fragmentation and re-assembly scheme, so that it can divide IEEE 802.11 packets in chunks that can be accommodated in the number of Bluetooth slots that are available. The IEEE 802.11's own fragmentation mechanisms cannot be used, since these mechanisms assume that all fragments are sent consecutively. In the detailed implementation described hereinbelow, a suitable fragmentation scheme is discussed.

In the following, an example is given for introducing the IEEE 802.11 functionality into a Bluetooth radio system, to enable both radio systems to function together in the same device. The following example is not limiting of the present invention, and the person skilled in the art will recognise that other possibilities exist for the implementation of such an architecture. However, as the Bluetooth specification is dominant the following is a preferred implementation.

The standard Bluetooth radio system uses Frequency Shift Keying (FSK) modulation, sending one bit of information per symbol time of 1 μs. Thus the raw bit-rate is 1 Mbit/s. A packet consists of a preamble, containing a channel access code and a payload. The payload, in turn, is divided into a header (containing packet type, destination address and some other information fields) and a user payload field.

Figure 3:
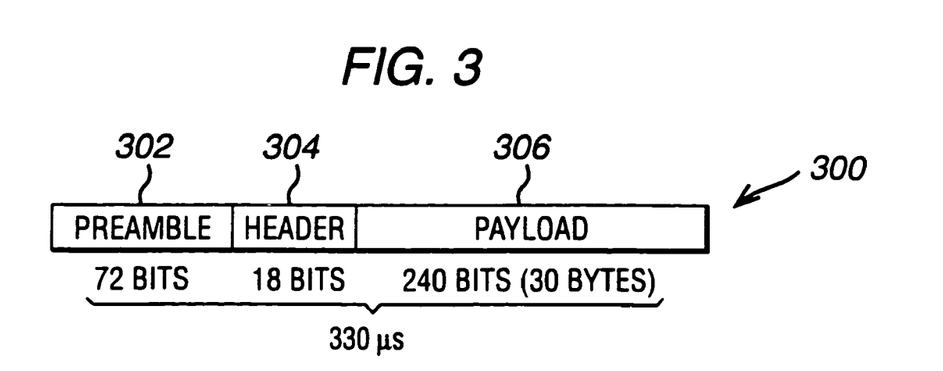
FIG. 3 illustrates a Bluetooth HV-i packet.

On the synchronous connection orientated (SCO) links, voice packets are used. The voice packets are typically of the high-quality voice (HV) types HV1, HV2 or HV3. All of these packet types have a 30-byte payload. The most robust packet, HV1, uses rate 1/3 Forward Error Correction (FEC). Packet type HV2 uses rate 2/3 FEC, and type HV3 does not use FEC at all. The number of user bytes is 10,20 and 30 bytes respectively for HV1, HV2 and HV3. The packet layout of an Hv-i (where i=1,2,3) packet is shown in FIG. 3. The total duration of a HV-i voice packet is 330 μs. Referring to FIG. 3, it can be seen that the Hv-i packet 300 comprises a 72 bit preamble 302, an 18 bit header 304, and a 240 bit (or 30 byte) payload 306.

In addition to the HV-i type packets, there also exists for Bluetooth a data and voice (DV) type packet. The DV type packet offers the same performance as HV3 (i.e. with no FEC), and carries a variable amount of data as well as voice in the same packet. However, a DV packet carries only 10 user bytes, i.e. a third of HV3's user bytes. The duration of the DV packet is 238 to 356 μs, depending on the amount of data carried.

Figure 4:
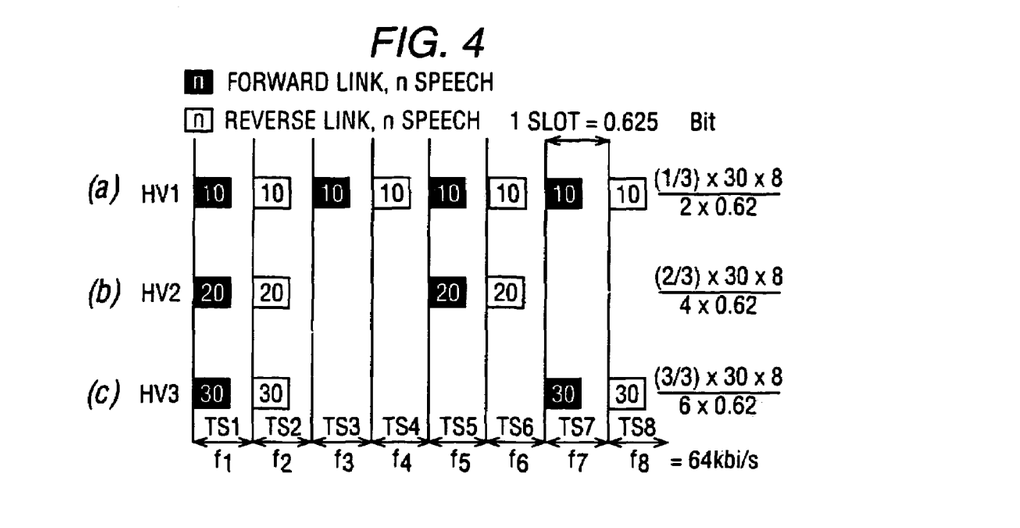
FIG. 4 illustrates the time-slot allocation for transmission of three different HV-i schemes.

Bluetooth packets are sent in time slots, which each have a duration of 625 μs. However packets must be less then 625 μs to allow the radio system sufficient time to hop to another frequency between time slots. Examples of channel operation for HV1, HV2 and HV3 connection are shown in FIG. 4, and described further hereinbelow.

FIGS. 4(a) to 4(c) illustrate timing diagrams for a single Bluetooth voice connection, based on HV1 (FIG. 4(a)), HV2 (FIG. 4(b)), or HV3 (FIG. 4(c)) packets. The shaded packets are in the forward direction (from Bluetooth master device to Bluetooth slave device), and the clear packets are in the reverse direction (from Bluetooth slave device to Bluetooth master device). Eight time slots TS1 to TS8 are shown. As can be seen forward packets are sent in odd-numbered time-slots and reverse packets are sent in even-numbered time-slots. The frequency hops, in accordance with the Bluetooth standard, on every time slot, such that the frequencies $f_1$, to $f_8$ are hopped-to in times slots TS1 to TS8 respectively.

All voice connection rates are specified to be 64 kbit/s. To achieve this rate a HV1 packet must be sent every other slot, since in every HV1 packet $(1/3) \times 30 \times 8 = 80$ bits of user data are sent. (1/3) is the FEC used in HV1, and $30 \times 8$ is the number of bits in a 30 byte payload. One packet is sent every $2 \times 0.625$ ms time-slots, which is equal to 1.25 milliseconds, 0.625 ms being the length of each slot. The user bit rate is thus 80/1.25 bits/ms=64 kbit/s. Since a voice link is full duplex, the other remaining alternate empty slots are required for the reverse link. This allocation of forward and reverse packets to time-slots is shown in FIG. 4(a).

HV2 packets carry twice the number of user bits as HV1 packets and hence only one forward and one reverse packet is required for every four slots, as shown in FIG. 4(b).

HV3 packets carry twice the number of user bits as HV1 packets and hence only one forward and one reverse packet is required for every six slots, as shown in FIG. 4(c). Thus even if there were two HV3 links active, there would still be required only four time-slots in every six time-slots, leaving two time-slots in every six free.

As a DV packet, similar to a HV1 packet, carries only 10 user bytes, a DV packet must similarly be transmitted every other slot to achieve a rate of 64 kbit/s.

Hence in combination with a single HV1 or DV voice link, no IEEE 802.11 data traffic can be transmitted or received without reducing the voice quality of the transmission.

With a single HV2 link, or HV3 links, two slots are available for IEEE 802.11 traffic. With a single HV3 link, 4 slots are available for IEEE 802.11 traffic.

Working within these parameters set by the Bluetooth transmission system, it is necessary to determine what IEEE 802.11 user bit rate is possible, given the available time slots. As discussed further hereinbelow, this depends to a certain extent on the overhead of the IEEE802.11 packet.

Figure 5:
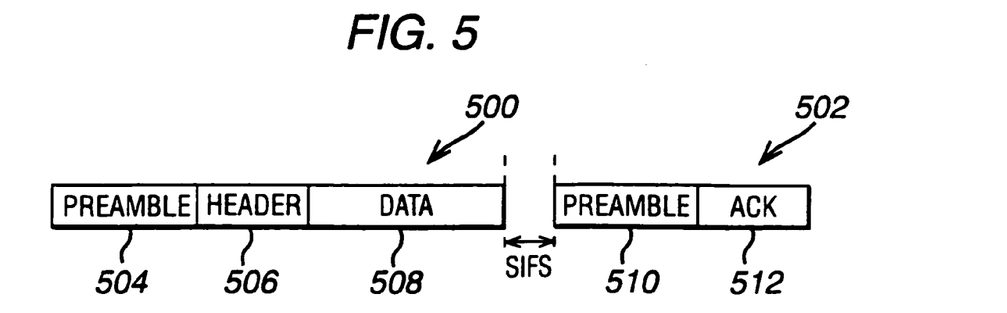
FIG. 5 illustrates a forward and reverse packet structure for IEEE 802.11.

IEEE 802.11 packets have either a short or a long preamble, of 96 or 192 μs respectively. The IEEE 802.11 packet payload is transmitted at a rate of one byte in every symbol time with a duration of 8/11-th μs. This gives a bit rate of 11 Mbit/s. The payload contains a 24 byte header and a 32 bit (4 byte) CRC field, which takes $28 \times (8/11) = 20.3$ μs to send in total. A SIFS (Short Inter-frame Space) time of 10 μs after correct reception of a packet, the recipient transmits an acknowledgement packet, which consists of a header of 96 or 192 μs. The payload contains MAC protocol control information of 14 bytes that take $14 \times 8/11 = 10.2$ μs to transmit. FIG. 5 depicts an IEEE 802.11 packet transmission.

Figure 6:
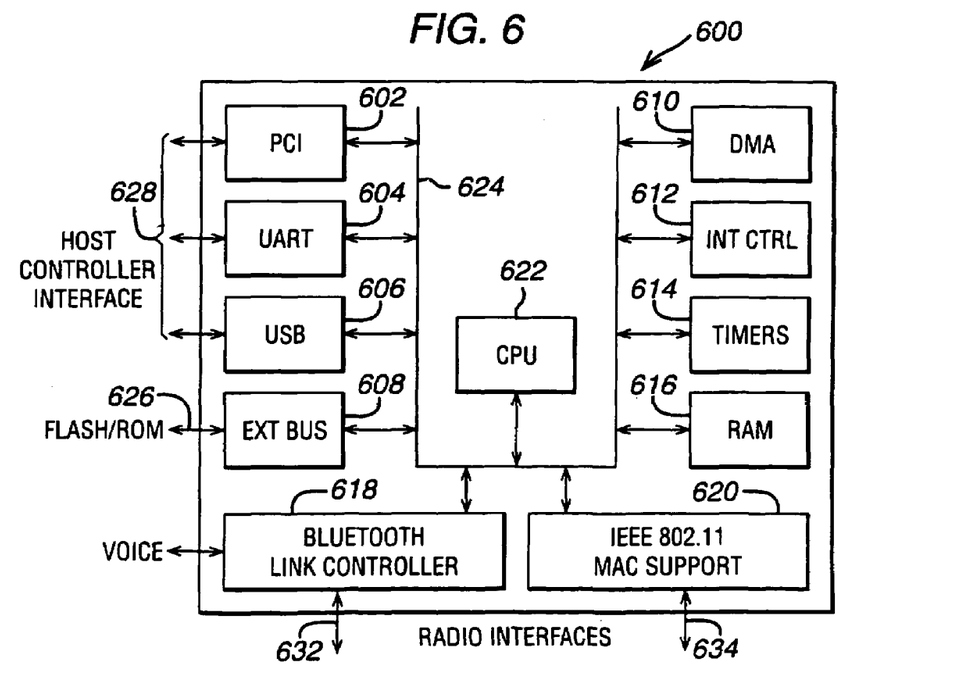
FIG. 6 illustrates a possible single chip implementation of the present invention.

As shown in FIG. 6, an IEEE 802.11 forward data packet 500 consists of a preamble 504, a MAC header 506 and a data field 508. If received correctly, the receiver, responds with an acknowledgement packet 502 after a SIFS period. The latter packet consists of a preamble 510 and an acknowledgement field 512 comprising MAC information.

There are thus 4 scenarios to consider: there are two possible IEEE preamble lengths (96 and 192 μs); and there are either two or four Bluetooth "idle" periods (two and four slots).

The scenario where two Bluetooth slots are available for transmission for IEEE transmissions having a long preamble is considered.

The overhead due to preambles, SIFS, and MAC overhead amounts to $[2 \times 192] + 10 + [(28+14) \times (8/11)] = 424.5$ μs. Of the two idle slots, it is permissible only to use $625 + 366 = 991$ μs according to the Bluetooth specification. This is to leave $625 - 366 = 259$ μs to allow the radio system to hop to the frequency of the next slot. Subtract 424.5 from 991, to get 566.5, which is the time left for actual data transmission at 11 Mbit/s. In this time $566.5/(8/11) = 779$ IEEE 802.11 bytes can be transmitted. This data can be transmitted every 4 slots. Hence the effective bit rate is equal to $(8 \times 779)/(4 \times 625) = 2.5$ Mbit/s.

The scenario where four Bluetooth slots are available for transmission for IEEE transmissions having a long preamble is now considered.

If four Bluetooth slots are available, then the time for payload transmission is equal to payload time $625 \times 3 + 366 - 424.5 = 1817$. This Equates to $1817/(8/11) = 2498$ IEEE 802.11 CCK bytes. The equivalent bit rate is now $(8 \times 2498)/(6 \times 625) = 5.33$ Mbit/s.

If the calculations are repeated for short IEEE 802.11 preambles, the bit rates are 3.33 Mbit/s for an HV2 connection or for two HV3 connections. For a single HV3 connection the bit rate is 5.89 Mbit/s. The results are summarised in Table 1.

TABLE 1

| IEEE 802.11 throughput | Two Slots | Four Slots |
| --- | --- | --- |
| Short preamble | 3.33 Mbit/s | 5.89 Mbit/s |
| long preamble | 2.49 Mbit/s | 5.33 Mbit/s |

Table 1 shows IEEE 802.11 user throughputs if IEEE 802.11 packets are transmitted in slots that are left idle by Bluetooth. If there is one HV2 connection or two HV3 connections, there are 2 idle slots to transmit. If there is one HV3 connection, there are 4 idle slots to transmit. If there is on HV1 or DV1 connection there are no idle slots. If there is no SCO connection at all, then all slots are available for transmission, and the theoretical IEEE 802.11 maximum of 11 Mbit/s can be achieved.

If a Bluetooth ACL packet must be transmitted, the interoperability device 106 simply holds back IEEE 802.11 packets. As the ACL packets are none real time data packets, they can be held back. When a Bluetooth ACL packet is to be transmitted, an IEEE 802.11 packet transmission will not be in progress, as the ACL connection would be in PARK mode if an IEEE transmission was in progress, as discussed hereinabove.

In an alternative formulation, if a Bluetooth ACL packet transmission or reception is in progress, the IEEE 802.11 transmission is held back until the Bluetooth transmission/reception is completed. Then the Bluetooth ACL connection is put in HOLD or PARK mode, and the IEEE802.11 transmission can be scheduled and organised around SCO transmissions, as described above.

Optionally, the interoperability device has a further mode in which it will not allow the IEEE 802.11 devices and Bluetooth device to receive in parallel. By not allowing this, only one radio will be operating at a given time, which implies that the radio hardware can be reused. This again results in an architecture as shown in FIG. 2. In this mode Bluetooth SCO slots are always received. If neither the Bluetooth nor the IEEE 802.11 transmitter need to transmit, the common receiver listens to either Bluetooth or IEEE 802.11 packets, according to an algorithm.

Such an algorithm may be static; for instance the receiver listens to IEEE 802.11 in odd slots and to Bluetooth packets in even slots. Also given the distribution of traffic between Bluetooth and IEEE802. 11, the algorithm could give preference to one over the other.

Finally, the receiver may have a dual synchronisation mode, where it listens to the channel, detects on the fly what type of packet is in the medium (Bluetooth or IEEE 802.11), and reports this to the receiver, which will switch to the appropriate reception mode.

Both IEEE 802.11 and Bluetooth Packets may be longer than a single slot. In that case the receiver attempts to receive the packet until completion.

In a typical embodiment of the invention, the MAC controller of the IEE802.11 device and the baseband controller of the Bluetooth device may be implemented in separate, dedicated processor chips. The interoperability device's functionality may be implemented in an additional chip. Alternatively, the functionality of the interoperability device can be added to the controller chips of either the Bluetooth or the IEE802.11 device. In a still further alternative, it is possible to integrate the IEEE 802.11 MAC control functions and the Bluetooth control function in a single chip and add the interoperability functionality to the same chip as well. Other arrangements of chips and division of interoperability functionality are also possible.

FIG. 6 illustrates an example of a "system on a chip" implementation of a combined IEEE 802.11 MAC controller and a Bluetooth Baseband controller. The chip 600 includes a DMA (Direct Memory Access) 610, an interrupt controller (Int. Ctrl) 612, timers 614, RAM (Random Access Memory) 616 all connected to a CPU (central processor unit) 622 via an internal bus 624, which elements are all required for both the IEEE 802.11 and Bluetooth functions. An external bus (Ext. Bus) block 608 is also required for both the IEEE 802.11 and Bluetooth functions, and is connected to the CPU 622 via internal bus 624 and to an external flash memory and/or ROM via lines 626. A USB (Universal Serial Bus) block 606, connected to internal bus 624, is used to interface the Bluetooth transceiver and optionally the IEEE 802.11 transceiver to a host PC via connections 628. The (mini) PCI block 602, connected to the internal bus 624, is used to interface between the host PC (via connections 628) and the IEEE 802.11 transceiver. A PCI based interface between host PC and Bluetooth is not yet defined but is foreseen. The UART block is also connected to the internal bus 624 and to the external connections 628.

The CPU micro-controller 622 runs firmware that implements the IEEE 802.11 MAC and Bluetooth baseband functions. A Bluetooth Link Controller block 618 and an IEEE 802.11 MAC support block 620 are connected to the CPU via the internal bus 624, and operate in conjunction with the CPU 622 to implement hardware assist functions for both the Bluetooth and IEEE 802.11 transceivers respectively.

The Bluetooth Link Controller 618 is connected to the Bluetooth physical layer functional elements (not shown) via connections 632, and similarly the IEEE 802.1 MAC support block 620 is connected to the IEEE 802.11 physical layer functional elements (not shown) via connections 634.

The invention claimed is:

1. A communication device, comprising:
a first radio system operating at a first range of frequencies; and
a second radio system operating at a second range of frequencies;
a controller adapted to control said first radio system and said second radio system such that only one of said first radio system and said second radio system may transmit at any one time; and
a multiplexer adapted to time multiplex transmissions from said first radio system and said second radio system such that time slots are not assigned to receive from both said first radio system and said second radio system at a same time;
wherein at least a part of said first range of frequencies and said second range of frequencies overlap.

2. The communication device of claim 1, wherein:
said first radio system is a Bluetooth system and said second radio system is an IEEE 802.11 system.

3. The communication device of claim 1, wherein:
when said first radio system is transmitting said second radio system cannot receive or transmit.

4. The communication device of claim 3, wherein:
when said first radio system is receiving said second radio system cannot receive or transmit.

5. The communication device of claim 2, wherein said controller further comprises:
a switch adapted to switch on and off said first radio system and said second radio system.

6. The communication device of claim 2, wherein:
said controller comprises a multiplexer adapted to time multiplex transmissions from said Bluetooth system and said IEEE 802.11 system, said IEEE 802.11 and said Bluetooth transmissions being multiplexed into Bluetooth time-slots.

7. A communication device, comprising:
a first radio system operating at a first range of frequencies, said first radio system being a Bluetooth system; and
a second radio system operating at a second range of frequencies, said second radio system being an IEEE 802.11 system;
a controller adapted to control said first radio system and said second radio system such that only one of said first radio system and said second radio system may transmit at any one time;
wherein at least a part of said first range of frequencies and said second range of frequencies overlap;
wherein said controller comprises a multiplexer adapted to time multiplex transmissions from said first radio system and said second radio system; and
wherein said Bluetooth transmissions are through a single HV2 SCO link connection, and said IEEE 802.11 transmissions being in two time-slots in every four.

8. A communication device, comprising:
a first radio system operating at a first range of frequencies, said first radio system being a Bluetooth system; and
a second radio system operating at a second range of frequencies, said second radio system being an IEEE 802.11 system;
a controller adapted to control said first radio system and said second radio system such that only one of said first radio system and said second radio system may transmit at any one time;
wherein at least a part of said first range of frequencies and said second range of frequencies overlap;
wherein said controller comprises a multiplexer adapted to time multiplex transmissions from said first radio system and said second radio system; and
wherein said Bluetooth transmissions are through a single HV3 SCO link connection, said IEEE 802.11 transmissions being in four time-slots in every six.

9. A communication device, wherein:
a first radio system operating at a first range of frequencies, said first radio system being a Bluetooth system; and
a second radio system operating at a second range of frequencies, said second radio system being an IEEE 802.11 system;
a controller adapted to control said first radio system and said second radio system such that only one of said first radio system and said second radio system may transmit at any one time;
wherein at least a part of said first range of frequencies and said second range of frequencies overlap;
wherein said controller comprises a multiplexer adapted to time multiplex transmissions from said first radio system and said second radio system; and
wherein said Bluetooth transmissions are through two HV3 SCO link connections, said IEEE 802.11 transmissions being in two time-slots in every six.

10. The communication device of claim 2, wherein:
said controller prevents transmission of IEEE 802.11 packets during a Bluetooth ACL packet transmission.

11. The communication device of claim 2, wherein:
said controller prevents transmission of Bluetooth ACL packets during an IEEE 802.11 packet transmission.

12. The communication device of claim 11, wherein:
said first radio system and said second radio system share a common physical layer.

13. A method of communicating utilizing a first radio system and a second radio system, comprising:
incorporating a first radio system operating at a first range of frequencies and a second radio system operating at a second range of frequencies into a single device;
overlapping at least a part of said first range of frequencies and said second range of frequencies;
time multiplexing transmissions from said first radio system and said second radio system such that time slots are not assigned to receive from both said first radio system and said second radio system at a same time;
controlling said first radio system and said second radio system with only one of said first radio system and said second radio system transmitting at any one time.

14. The method of claim 13, wherein:
said first radio system is a Bluetooth system and said second radio system is an IEEE 802.11 system.

15. The method of claim 13, further comprising:
controlling said first radio system and said second radio system such that when one radio system is transmitting a remaining radio system cannot receive or transmit.

16. The method of claim 15, further comprising:
controlling said first radio systems and said second radio system such that when one radio system is receiving a remaining radio system cannot receive or transmit.

17. The method of claim 14, wherein:
said first radio systems and said second radio system are controlled by switching on and off said first radio system and said second radio system.

18. A method of communicating utilizing a first radio system and a second radio system, comprising:
incorporating a first radio system operating at a first range of frequencies and a second radio system operating at a second range of frequencies into a single device;
overlapping at least a part of said first range of frequencies and said second range of frequencies; and
controlling said first radio system and said second radio system such that only one of said first radio system and said second radio system transmits at any one time;
wherein said Bluetooth transmissions are through a single HV2 SCO link connection, said IEEE 802.11 transmissions being in two time-slots in every four.

19. A method of communicating utilizing a first radio system and a second radio system, comprising:
incorporating a first radio system operating at a first range of frequencies and a second radio system operating at a second range of frequencies into a single device;
overlapping at least a part of said first range of frequencies and said second range of frequencies; and
controlling said first radio system and said second radio system such that only one of said first radio system and said second radio system transmits at any one time;
wherein said Bluetooth transmissions are through a single HV3 SCO link connection, said IEEE 802.11 transmissions being in four time-slots in every six.

20. A method of communicating utilizing a first radio system and a second radio system, comprising:
incorporating a first radio system operating at a first range of frequencies and a second radio system operating at a second range of frequencies into a single device;
overlapping at least a part of said first range of frequencies and said second range of frequencies; and
controlling said first radio system and said second radio system such that only one of said first radio system and said second radio system transmits at any one time;
wherein said Bluetooth transmissions are through two HV3 SCO link connections, said IEEE 802.11 transmissions being in two time-slots in every six.

21. The method of claim 14, further comprising:
preventing transmission of IEEE 802.11 packets during a Bluetooth ACL packet transmission.

22. The method of claim 14, further comprising:
preventing transmission of Bluetooth ACL packets during an IEEE 802.11 packet transmission.

23. The method of claim 22, wherein:
said first radio system and said second radio systems share a common physical layer.

24. A communication apparatus, comprising:
means for incorporating a first radio system operating at a first range of frequencies and a second radio system operating at a second range of frequencies into a single device;

means for overlapping at least a part of said first range of frequencies and at least a part of said second range of frequencies;

means for time multiplexing transmissions from said first radio system and said second radio system such that time slots are not assigned to receive from both said first radio system and said second radio system at a same time; and means for controlling said first radio system and said second radio system such that only one of said first radio system and said second radio system transmits at any one time.

25. The apparatus of claim 24, wherein:
said first radio system is a Bluetooth system and said second radio system is an IEEE 802.11 system.

26. The apparatus of claim 24, further comprising:
means for controlling said first radio systems and said second radio system such that when one radio system is transmitting a remaining radio system cannot receive or transmit.

27. The method apparatus of claim 26, further comprising:
means for controlling said first radio systems and said second radio system such that when one radio system is receiving a remaining radio system cannot receive or transmit.

28. The apparatus of claim 24, wherein:
said first radio systems and said second radio system are controlled by switching on and off said first radio system and second radio system.

29. A communication device, comprising:
a first radio system operating at a first range of frequencies;
a second radio system operating at a second range of frequencies overlapping at least in part with said first range of frequencies; and
a controller adapted to slot-steal from a protocol associated with said first radio system to schedule wireless asynchronous data associated with said second radio between periodic transmissions or receptions of wireless data associated with said first radio system;
wherein said scheduling assures that said first radio system does not transmit at a time that said second radio system is receiving, and that no time slot is assigned to receive such that time slots are not assigned to receive from both said first radio system and said second radio system at a same time.

30. A communication device according to claim 29, wherein:
said schedule is software programmable.

31. The communication device according to claim 29, wherein:
said first radio system is a Bluetooth system and said second radio system is an IEEE 802.11 system.

32. The communication device according to claim 29, wherein:
when said first radio system is transmitting, said second radio system is prevented from receiving and transmitting.

33. The communication device according to claim 31, wherein said controller comprises:
a multiplexer adapted to time multiplex transmissions from said Bluetooth system and said IEEE 802.11 system, said IEEE 802.11 and said Bluetooth transmissions being multiplexed into Bluetooth time-slots.

34. The communication device according to claim 31, wherein:
said controller prevents transmission of an IEEE 802.11 packet during transmission of a Bluetooth ACL packet.

35. The communication device according to claim 31, wherein:
said controller prevents transmission of a Bluetooth ACL packet during transmission of an IEEE 802.11 packet.

36. The communication device according to claim 29, wherein: said first radio system and said second radio system share a common physical layer.

37. Apparatus for avoiding interference in a dual-radio communication device, comprising:
means for operating a first radio system at a first range of frequencies;
means for operating a second radio system at a second range of frequencies overlapping at least in part with said first range of frequencies; and
means for slot-stealing from a protocol associated with said first radio system to schedule wireless asynchronous data associated with said second radio system between periodic transmissions or receptions of wireless data associated with said first radio system;
wherein said scheduling assures that said first radio system is prevented from transmitting at a time that said second radio system is receiving, and that no time slot is assigned to receive such that time slots are not assigned to receive from both said first radio system and said second radio system at a same time.

38. The apparatus for avoiding interference in a dual-radio communication device according to claim 37, wherein:
said schedule is software programmable.

39. The apparatus for avoiding interference in a dual-radio communication device according to claim 37, wherein:
said first radio system is a Bluetooth system and said second radio system is an IEEE 802.11 system.

40. The apparatus for avoiding interference in a dual-radio communication device according to claim 37, further comprising:
means for preventing said second radio system from receiving and transmitting when said first radio system is transmitting.

41. The apparatus for avoiding interference in a dual-radio communication device according to claim 39, wherein said means for scheduling comprises:
multiplexing means for time multiplexing transmissions from said Bluetooth system and said IEEE 802.11 system, said IEEE 802.11 and said Bluetooth transmissions being multiplexed into Bluetooth time-slots.

42. The apparatus for avoiding interference in a dual-radio communication device according to claim 39, wherein:
said means for scheduling prevents transmission of an IEEE 802.11 packet during transmission of a Bluetooth ACL packet.

43. The apparatus for avoiding interference in a dual-radio communication device according to claim 39, wherein:
said means for scheduling prevents transmission of a Bluetooth ACL packet during transmission of an IEEE 802.11 packet.

44. The apparatus for avoiding interference in a dual-radio communication device according to claim 37, wherein:
said first radio system and said second radio system share a common physical layer.

* * * * *